३,२८४,५४२

PREPARATION OF HIGH IMPACT COMPOSITIONS FROM VINYL AROMATIC MONOMERS AND RUBBERY DIOLEFIN POLYMERS

Frederick E. Carrock and Kenneth W. Doak, Wyckoff, N.J., assignors to Rexall Drug and Chemical Company, Los Angeles, Calif., a corporation of Delaware
No Drawing. Filed Mar. 22, 1963, Ser. No. 267,365
13 Claims. (Cl. 260—880)

This invention relates to a bulk-suspension process for preparing rubber reinforced polymer compositions and, more particularly, a bulk-suspension process for preparing rubber reinforced, vinyl aromatic polymers, such as high impact polystyrene.

It is well known in the plastics art that thin section plastics products prepared by injection or compression molding of unmodified or general purpose polystyrene have a serious drawback in that nominal flexing of such products often leads to cracking and frequently complete failure at the locus of stress. In order to overcome this objectionable feature, it has been customary to incorporate rubbery polymer in polystyrene so that plastic products molded therefrom will have high impact strength and increased toughness. Rubber-modified polystyrene can be prepared by physically blending rubber and polystyrene or by dissolving rubbery polymer in styrene monomer liquid and subsequently polymerizing the monomer solution under suitable polymerization conditions to obtain high impact interpolymers or graft copolymers.

In British Patent 609,692, dated October 5, 1948, there is disclosed a method for polymerizing styrene which is stated to possess certain advantages over mass or bulk techniques, as well as emulsion and suspension polymerization systems. Specifically with reference to suspension or bead polymerizations, it is state that it is particularly difficult to form beads of uniform size partly due to inability to control the processing conditions during the "tacky" or "sticky" stage when the tendency of particles to coalesce is very pronounced. Moreover, it is further stated that another disadvantage of prior suspension or bead polymerization systems resides in the fact that globules of monomer are saturated with water and, consequently, at the end of the polymerization process, a considerable amount of water is occluded in the polymer beads. These observations have been confirmed by other workers including applicant's herein.

The technique suggested by the British patentees for overcoming the foregoing stated disadvantages in suspension polymerization of styrene and copolymers of styrene involves the steps of first, bulk polymerizing or copolymerizing styrene and other monomers to a conversion of preferably from 50 to 80% of the monomer(s) to polymer and secondly, introducing the viscous polymer or copolymer mass in the form of substantially uniform sized discrete beads or globules into a heated inert liquid medium, such as an aqueous or polyhydric alcohol medium and polymerizing to substantial conversion. To obtain uniform beads according to this technique, however, it is required to use a mechanical device to cut or subdivide the partially bulk polymerized material. In this manner, after the mechanical operation of "cutting" the polymer particles to the desired size, it is possible to thereafter conclude the polymerization reaction and obtain the desired polymer beads.

According to this invention, it has been found that it is not necessary to mechanically cut or "size" the bulk prepolymer in a bulk-suspension system for preparing beads of uniform size.

It is accordingly an object of this invention to provide an improved bulk-suspension polymerization process wherein beads of uniform size are obtained without requiring the steps of mechanically cutting or sizing bulk prepolymer, thereby omitting the associated equipment required for this step.

A further object of this invention is to prepare uniform polymer beads containing a minimum of occluded water in a bulk-suspension polymerization process.

A still further object of this invention is the provision of an efficient bulk-suspension process wherein a preformed partially bulk polymerized prepolymer is suspended in an aqueous solution and wherein optimum prepolymer to water ratios are employed, as more fully illustrated hereinbelow.

Another object of this invention is to provide an improved process for preparing rubber-modified, high impact vinyl aromatic polymers in a two step bulk-suspension technique.

This invention provides a process for preparing rubber-reinforced, impact-resistant thermoplastic vinyl aromatic polymers in granular form, which comprises forming a monomer rubber solution by dissolving a rubbery polymer or copolymer in a vinyl aromatic hydrocarbon monomer or ring substituted or halogenated vinyl aromatic hydrocarbon monomer or mixtures thereof, partially bulk polymerizing the monomer onto the rubbery polymer or copolymer to an extent of from 10 to 45 percent conversion, suspending the resulting prepolymer in an aqueous solution containing therein as a suspending agent hydroxyethyl cellulose and continuing polmerization employing a peroxide initiator until said monomer is substantially completely polymerized.

By bulk prepolymerization is meant that the monomer and dissolved rubber are polymerized without the addition of aqueous diluents (although other inert hydrocarbons can be present in minor amounts).

The vinyl aromatic monomers which can be graft-copolymerized onto rubbery polymer(s) in accordance with the method of the invention include styrene and substantial equivalents thereof, as for example, vinyl aromatic compounds having the aromatic nucleus substituted with one or more groups such as methyl, ethyl and chloro groups illustrated by such monomers as vinyltoluene, vinylxylene, vinylethylbenzene and vinylchlorobenzene or mixtures of these and including minor amounts of alpha-methylstyrene.

Reference will hereinafter be made to styrene as the preferred vinyl aromatic hydrocarbon monomer, although any of the previously mentioned substituted monmers can also be used according to the teachings herein.

The vinyl aromatic monmer liquid is added to a vessel equipped with a stirrer and agitation of the monomer is commenced. To the agitated monomer liquid there is added preferably finely ground, monomer-soluble, rubbery polymer in an amount from about 2 to 25 weight percent, preferably 4 to 20 weight percent. Rubbery polymers which can be employed in the process of this invention include, for example, polybutadiene, polyisoprene, polycyclopentadiene, natural rubber, chlorinated rubber, copolymers of butadiene with styrene (SBR rubbers), copolymers of butadiene with acrylonitrile (specifically those containing from 65 to 85 percent by weight of butadiene and from 35 to 15 percent of acrylonitrile), copolymers of isobutylene and a minor amount of butadiene or isoprene and mixtures thereof. The polybutadiene or polyisoprene rubbery materials (homopolymers of butadiene or isoprene) can be of the linear or non-linear type.

SBR type rubbers are copolymers of from 5 to 50 percent by weight of styrene and 95 to 50 percent by weight of butadiene. Reference will be made hereafter to a specific copolymer which has 75 percent butadiene and 25 percent styrene by weight in the copolymer form unless otherwise indicated. All the foregoing polymers and copolymers will be referred to herein as rubbery polymers unless otherwise noted.

In one of the preferred embodiments of this invention, it has been found that when linear polybutadiene having a cis (polymerized by 1,4-addition) content of about 30 to 98 percent, preferably 35 to 50%, is used as the rubbery polymer, a solid plastic material is obtained which has outstanding properties with respect to low temperature impact, gloss, heat deflection and melt flow. The preferred cis-polybutadiene which can be employed in the in the process of this invention has a viscosity between 20 to 60 as measured on the Mooney viscometer at 212° F. (ML-4). The cis-1,4 form for polybutadiene can be produced either by lithium metal or lithium alkyls or by a Ziegler type catalyst system as is well known in the art.

To the styrene monomer liquid, having dissolved therein rubbery polymer, there can be added advantageously conventional inert fillers, antioxidants, chain regulators and lubricants. As an antioxidant material there can be used alkylaryl phosphites such as trisnonylphenyl phosphite in amounts from about .01 to 1.0 weight percent. As chain regulators there can be added mercaptans such as t-dodecyl mercaptan in amounts from about .01 to 0.2 weight percent. Generally, it is also desirable to add lubricants in order to improve the flow and moldability of the composition. Suitable lubricants include, for example, refined mineral oils, mixtures of paraffin wax and hydrocarbon oil, or ester lubricants such as butylstearate in amounts of from about 1 to 4 weight percent.

The styrene monomer liquid solution including dissolved rubbery polymer in the preferred embodiment herein is prepolymerized in bulk with or without an initiator according to known techniques until preferably about 15 to 35 percent conversion. The prepolymerization step generally takes from about two to four hours. Low temperature peroxide initiators, such as benzoyl peroxide, laurolyl peroxide, caproyl peroxide, azo-bis-isobutyronitrile can be used as well as higher temperature peroxide initiators such as t-butyl perbenzoate (t-butyl peroxybenzoate according to Chemical Abstracts nomenclature), di-t-butyl peroxide, cumyl peroxide, t-butyl peroxyacetate, diethyl peroxide, or any initiator normally used for styrene polymerization can be used. If thermal initiation is used, then the prepolymerization can be conducted generally at temperatures of from 115 to 130° C. but preferably 120 to 125° C. in order to obtain good polymerization rates.

Upon completion of the prepolymerization step, the prepolymer, while maintaining conditions of agitation, can be cooled to a temperature in the range of about 60 to 80° C. and an initiator similar to the ones mentioned above, but preferably t-butyl perbenzoate can be added thereto to complete the polymerization in suspension. A suspension polymerization initiator is usually required to shorted the overall polymerization time-temperature cycle, specifically where the prepolymer has been prepared by a thermal catalytic technique.

Combinations of initiators can also be used in the suspension step. Thus, benzoyl peroxide can be used alone or in combination with di-t-butyl peroxide or cumyl peroxide. t-Butyl perbenzoate can also be used alone or in combination with the foregoing, or di-t-butyl peroxide alone. The preferred initiator used is t-butyl perbenzoate alone or in combination with di-t-butyl peroxide.

The amount of initiator used in the suspension step is based on the weight of the prepolymer and the amounts are from .05 to 0.3 percent by weight when a particular initiator is used alone or from .025 to 0.25 percent by weight of each when the combination is employed. Preferred amounts are about 0.2 percent by weight for a single initiator and 0.15 percent by weight for each of a combination.

The prepolymer before or after the addition of the initiator is suspended in an aqueous solution containing hydroxyethyl cellulose as the suspending agent and polymerization is continued at time-temperature cycles to be set forth hereinbelow, until the monomer is substantially completely polymerized into uniform-sized granules or beads.

The aqueous suspension is prepared by dissolving hydroxyethyl cellulose therein, suitable at ambient temperatures in an amount from about .025 to 1.5 weight percent and preferably in an amount from about .075 to 0.25 weight percent based on the weight of the water. Although hydroxyethyl cellulose, a water-soluble non-ionic colloid, is readily available in various grades, rated according to thickening power in water, it has been found that optimum polymerization results are obtained with respect to minimum agglomeration, water occlusion and narrow range of bead size, when the hydroxyethyl cellulose used is such as to have a viscosity in a 1% aqueous solution at 25° C. of from about 750 to 10,000 cps. (Brookfield viscometer). A preferred viscosity range for a 1% aqueous solution is from 1500 to 3500 cps. (Brookfield at 25° C.). Hydroxyethyl cellulose exhibiting high viscosities in aqueous solutions as preferred herein and being readily soluble in hot or cold water is available commercially. (See also Brownell, H. H. et al., Can. J. Chem. 35, 677 (1957), and Cohen, S. G., et al., J. Amer. Chem. Soc., 72, 3954 (1950).)

The hydroxyethyl cellulose should be sifted into the suspension water slowly and with rapid stirring so as to avoid the formation of agglomerates and agitation should be controlled so as to give maximum turbulence and minimum air entrapment. A surface active agent such as sodium dodecylbenzene sulfonate can be advantageously included in the suspension water in an amount from about .001 to .01 weight percent.

After the hydroxyethyl cellulose is dissolved in the aqueous suspension, nitrogen gas is passed therethrough and maintained as a blanket over the solution whereby dissolved oxygen is displaced and the system is maintained substantially free of oxygen which has a deleterious effect on the initiator(s).

The time-temperature cycle best suited for completion of the polymerization in suspension after transferring the bulk prepolymer to the aqueous suspension is generally from 100 to 145° C. for a period of about 5 hours. When a low temperature initiator such as benzoyl peroxide is used, then temperatures as low as from 85° to 90° C. can be used. Excellent results are obtained with t-butyl perbenzoate alone or in combination with another peroxide initiator if the suspension is maintained at temperatures of from 100° to 115° C. for 3 hours and from 125° to 135° C. for 2 hours. The prepolymer is added to the suspension preferably in the vicinity of the agitator vanes so as to facilitate the formation and dispersion of polymer beads. The prepolymer is added in an amount such that the weight ratio of prepolymer to water is generally from about 1:2 to 5:4 with good results obtained at a weight ratio of about 1:1 to 5:4. These prepolymer to water ratios, as will be seen, contribute unique advantages to a process of this type.

The substantially completely polymerized beads prepared in accordance with the method herein described are separated from the suspension water by any of the conventional methods such as screening, sedimentation or centrifuging, dried, extruded, if desired, and pelletized and packaged.

The following examples further illustrate the method of the invention. Each of the polymerization steps described in the examples, unless otherwise indicated, was carried out in a glass-bottomed, sealed reactor capable of withstanding up to 200 p.s.i. pressure. Also, before sealing the reactor for continued polymerization during the suspension step, the reactor and contents were flushed with nitrogen.

EXAMPLE 1

In this example, various prior art suspension agents were tested and compared with hydroxyethyl cellulose in a suspension polymerization system for the purpose of demonstrating the unexpected superiority of hydroxyethyl cellulose in this aspect of the invention.

In Table I below, an SBR rubber copolymer (styrene and butadiene) was dissolved in styrene monomer and 200 parts of this styrene containing 6% styrene-butadiene copolymer dissolved therein was suspended in 400 parts of water containing the various suspending agents listed. The polymerization conditions and results are indicated below.

TABLE

| Run | Suspending Agent | Catalyst | Time (hours) | Temp. °C. | Result |
|---|---|---|---|---|---|
| 1 | 1.0 CMC | 0.15 dt-BP | 1 | 120 | Precipitated. |
| 2 | 1.0 PVA | 0.18 AIBN 0.15 t-BP | 1 | 90 | Do. |
| 3 | 0.25 SMA | 0.18 AIBN 0.15 t-BP | 1 | 90 | Failed (excess foam). |
| 4 | 0.5 SMA | 0.18 AIBN 0.15 t-BP | 1 | 90 | Do. |
| 5 | 1.0 SMA | 0.18 AIBN 0.15 t-BP | 1 | 90 | Do. |
| 6 | 0.25 SMA | 0.2 BP 0.15 t-BP | 1 | 90 | Do. |
| 7 | 0.5 HEC 0.025 SDBS | 0.2 BP 0.15 t-BP | 1 | 100-115 | Good bead formation. |
| 8 | 0.5 HEC 0.025 SDBS | 0.2 BP 0.15 t-BP | 1.5 at 90 to 100 2 at 90 to 120 |  | Do. |

(The abbreviations above stand for the following:
CMC—Carboxymethylcellulose-sodium salt,
PVA—Polyvinyl alcohol (98% hydrolyzed),
SMA—Styrene-maleic anhydride copolymer ($NH_4$ salt),
HEC—Hydroxyethyl cellulose,
SDBS—Sodium dodecylbenzene sulfonate,
dt-BP—di-t-Butyl peroxide,
AIBN—Azo-bis-isobutyronitrile,
t-BP—t-Butyl perbenzoate,
BP—Benzoyl peroxide).

In the above runs, only hydroxyethyl cellulose gave good beams of uniform size and minimum water occusion. It will be noted that carboxymethylcellulose, a well known suspending agent, failed under the above conditions to give polymer beads.

In further experimental trials wherein bulk-suspension polymerization conditions were varied, it was further found that hydroxyethyl cellulose, particularly of the type whose solution viscosity for a 1% solution ranges from 1,500 to 2,500 cps. (Brookfield at 25° C.), was unexpectedly superior to other cellulose products, for example, carboxymethylcellulose and methylcellulose. It was found, for example, that high suspension polymerization temperatures could be employed without causing breakdown or agglomerization of the suspension. Thus, suspension polymerizations at temperatures of 145° C. were successfully carried out without technical difficulties (e.g., suspension remained stable). Other suspending agents tried in impact polystyrene granular polymerizations usually are stable up to temperatures of 115° C. Some come out of solution at higher temperatures and others break down in some manner, whereby the suspension does not remain stable.

In other experimental runs, according to the process herein, various cellulosic products were tested as suspension agents (methylcellulose, carboxymethylcellulose) employing a prepolymer prepared from a styrene solution of styrene-butadiene copolymer to an extent of about 30% solids and the prepolymer solution was then added to an aqueous suspension containing the suspending agents. Using prepolymer to water ratios of 3 to 4, only the use of hydroxyethyl cellulose resulted in fine uniform polymer beads.

EXAMPLE II

In further experimental runs, the prepolymer to water ratio was increased (without increasing the concentration of suspending agent) to a ratio of 1:1 and 5:4 using hydroxyethyl cellulose as a suspending agent. In runs 9 through 14 in Table II below, a bulk polymerized styrene-rubber prepolymer containing 35 percent total solids was employed.

TABLE II

| Run No. | Prepolymer to Water | Percent Rubber (Polybutadiene-35 Percent Cis-1,4 type) | Suspending Agent, Percent (Based on water) | Catalyst t-Butyl Perbenzoate, Percent | Results |
|---|---|---|---|---|---|
| 9 | 1:1 | 8 | 0.25(1) | 0.2 | Fine beads. |
| 10 | 5:4 | 8 | 0.25(2) | 0.2 | Do. |
| 11 | 3:4 | 8 | 0.25(3) | 0.2 | Beads and some emulsion. |
| 12 | 1:2 | 8 | 0.25(4) | 0.2 | Failed. |
| 13 | 1:2 | 8 | 0.25(5) | 0.2 | Do. |
| 14 | 2:3 | 8 | 0.33(6) | 0.15 | Large irregular beads.* |

*Beads discolored badly when compression molded.
(1 and 2): Hydroxyethyl cellulose (1% solution viscosity of 1,500 to 2,500 at 25 degrees C.—Brookfield viscometer).
(3): Hydroxyethyl cellulose (vide infra).
(4 and 5): Carboxymethylcellulose—sodium salt.
(6): Methylcellulose.

The successful use of bulk prepolymer to water ratios of 1:1 and 5:4 (runs 9 and 10) using hydroxyethyl cellulose as a suspending agent indicate the efficiency of the process of this invention. Heretofore, it was not known nor expected that such high ratios of prepolymer to water could be successfully suspended and yet produce uniform size beads of maximum hue and color which did not discolor on application of heat. It will be noted that using a hydroxyethyl cellulose whose solution viscosity is too low (run 11, viscosity at 20° C., 2% aqueous solution, 225–325 cps.) results in formation of some emulsion during the reaction. Excellent results are, therefore, obtained with a hydroxyethyl cellulose having a 1% solution viscosity of 1500 to 2500 cps. at 25° C.

In the following examples the preferred amounts of antioxidant, chain regulator and lubricant were incorporated in the compositions as set forth below.

EXAMPLE 3

Eight (8) parts by weight of finely divided linear polybutadiene having a cis-1,4 content of 35% were added to and dissolved in 92 parts by weight of styrene monomer liquid with agitation. The agitated solution was heated to and maintained at a temperature of 120° C. until a prepolymer having a solids content of 27% was obtained. The prepolymer, under continuous agitation, was cooled to 80° C. and 0.2 weight percent of tertiary butyl perbenzoate was added thereto.

Hydroxyethyl cellulose, in an amount of 0.25 part by weight, having a viscosity in a 1% aqueous solution at 25° C. from about 1500 to 2500 cps., was added to and dissolved in 100 parts by weight of water with agitation. The agitated, aqueous solution was heated to a temperature of 95° C. and the prepolymer was suspended therein. The aqueous suspension was maintained at a temperature of 115° C. for 3 hours, at 125° C. for 1 hour and at a final temperature increment of 135° C. for 1 hour, after which time high impact beads were formed in suspension. The suspension was cooled and the beads, substantially uniform in size, were separated from the suspension water, washed and dried. A portion of such beads when compression-molded had an Izod impact strength (Test Method ASTM D-256-56 used in this and the remaining examples) of 1.6 ft. lb./inch as compared with general-purpose, crystalline polystyrene with an impact strength of 0.3 ft. lb./inch. Melt flow at 190° C. (grams/10 min.) was 0.03 (Test Method ASTM D-1238-57T used in this and the remaining examples).

EXAMPLE 4

Ten (10) parts by weight of finely divided linear polybutadiene having a cis-1,4 content of 35% were added to and dissolved in 115 parts by weight of styrene monomer liquid with agitation. The agitated solution was heated to and maintained at a temperature of 120° C. until a prepolymer having a solids content of 29% was obtained. The prepolymer, under continuous agitation, was cooled to a temperature of 80° C. and 0.2 weight percent of tertiary butyl perbenzoate was added thereto.

Hydroxyethyl cellulose, in an amount of 0.25 part by weight, having a viscosity in a 1% aqueous solution at 25° C. from about 1500 to 2500 cps., was added to and dissolved in 100 parts by weight of water with agitation. The agitated, aqueous solution was heated to a temperature of 95° C. and the prepolymer was suspended therein. The aqueous suspension was maintained at a temperature of 115° C. for 3 hours, at 125° C. for 1 hour and at a final temperature increment of 135° C. for 1 hour, after which time high impact, thermoplastic, moldable beads were formed in suspension. The suspension was cooled and the beads, substantially uniform in size, were separated from the suspension water, washed and dried.

EXAMPLE 5

Eight (8) parts by weight of finely divided linear polybutadiene having a cis-1,4 content of 35% were added to and dissolved in 92 parts by weight of styrene monomer liquid with agitation. The agitated solution was heated to and maintained at a temperature of 120° C. until a prepolymer having a solids content of 27% was obtained. The prepolymer under continuous agitation, was cooled to 80° C. and 0.15 weight percent of tertiary butyl perbenzoate and 0.15 percent of benzoyl peroxide was added thereto.

Hydroxyethyl cellulose, in an amount of 0.25 part by weight, having a viscosity in a 1% aqueous solution at 25° C. from about 1500 to 2500 cps. and 0.05 part sodium dodecylbenzene sulphonate were added to and dissolved in 100 parts by weight of water with agitation. The agitated aqueous solution was heated to a temperature of 95° C. and the prepolymer was suspended therein. The aqueous suspension was maintained at a temperature of 90° C. for 3 hours, at 100° C. for 1 hour, at 120° C. for 1 hour, after which time high impact, thermoplastic, moldable beads were formed in suspension. The suspension was cooled and the beads, substantially uniform in size, were separated from the suspension water, washed and dried. A portion of such beads, when compression molded, had an Izod impact strength of 1.8 ft. lb./inch and the melt flow at 190° C. was 0.9.

EXAMPLE 6

Four (4) parts by weight of finely divided butadiene-styrene copolymer containing 75 percent by weight of butadiene and 25 percent by weight styrene were dissolved in 96 parts by weight of styrene. The agitated solution was heated to and maintained at 120° C. until a solids content of 30 percent was obtained. The prepolymer was cooled at 60° C. and 0.2% by weight of benzoyl peroxide and 0.15% by weight of t-butyl perbenzoate were added.

Hydroxyethyl cellulose, in an amount of 0.25 part by weight, having a viscosity in a 1% aqueous solution at 25° C. from about 1500 to 2500 cps. was dissolved in 100 parts by weight of water. The agitated aqueous solution was heated to a temperature of 90° C. and the prepolymer suspended therein. The aqueous suspension was maintained at a temperature of 90° C. for 2 hours, at 100° C. for 1 hour, at 120° C. for 1 hour and finally at 130° C. for 1 hour. High impact uniform size beads were obtained.

EXAMPLE 7

This example illustrates the conditions under which masterbatch, rubber-modified, high impact styrene polymers can be prepared. All quantities in this example are in parts by weight unless otherwise specified. The hydroxyethyl cellulose used in this example was of a grade which has a viscosity in a 1% aqueous solution at 25° C. from about 1500 to 2500 cps.

Prepolymer A was prepared by adding with stirring 15 parts of linear polybutadiene having a cis-1,4 content of 35%, 3 parts of mineral oil, 0.5 part of trisnonylphenyl phosphite antioxidant, 0.15 part of benzoyl peroxide and 0.15 part of tertiary dodecyl mercaptan to 85 parts of styrene monomer liquid and the agitated reaction mixture was heated and maintained at a temperature of 75° C. until a total solids content of 33% was obtained. Prepolymer B was also prepared in accordance with this procedure and formulation. All of the prepolymers were cooled and stored under refrigeration until they were to be polymerized to bead form in the suspension step.

Part A 0.2 part of benzoyl peroxide and 0.15 part of tertiary butyl perbenzoate were added with stirring to 100 parts of prepolymer A and the prepolymer, in turn, was added with stirring to 160 parts of water containing 0.4 part of hydroxyethyl cellulose and the resulting suspension, while under agitation, was heated and maintained at 90° C. for 3 hours, at 115° C. for 1 hour and at a final temperature increment of 125° C. for 1 hour after which time high impact polymer beads were formed in suspension. The beads, after being separated from the suspension water, were washed and dried. Testing was performed on compression molded plaques and the results are set out in Table III, under column A.

Part B 0.2 part of tertiary butyl perbenzoate was added with stirring to 100 parts of prepolymer B and the prepolymer, in turn, was added with stirring to 133 parts of water containing 0.42 part of hydroxyethyl cellulose and polymerization was carried out at 115° C. for 3 hours, then 125° C. for 1 hour and finally 135° C. for 1 hour. Testing was performed on compression molded plaques and the results are set out in Table III under the column B.

TABLE III

| Physical Properties | Column A | Column B |
| --- | --- | --- |
| Izod Impact (ft. lb./inch) | 2.5 | 2.4 |
| Melt Flow (190° C.) | 0.1 | 0.1 |
| Tensile Yield (p.s.i.) | 530.0 | 590.0 |
| Tensile Fail (p.s.i.) | 1,360.0 | 1,780.0 |
| Elongation (percent) | 60.0 | 60.0 |

EXAMPLE 8

In further experiments aimed at producing high impact material by the process herein, it was found that many variables can be readily controlled to "tailor-make" a polymer of the desired properties.

In this example, the following formulation was employed for a high impact resin preparation:

| | |
| --- | --- |
| Styrene, weight percent | 91.48 |
| Polybutadiene (35% cis-1,4 content), weight percent | 6.0 |
| Mineral oil, weight percent | 2.0 |
| Trisnonylphenyl phosphite, weight percent | 0.50 |
| t-Dodecyl mercaptan, weight percent | 0.02 |

The above formulation was prepolymerized in bulk to a total solids content of 26.5 weight percent.

The formulation was then transferred to an aqueous suspension containing 0.075 weight percent based on water of hydroxyethyl cellulose. Additional mercaptan chain regulator (0.12 weight percent) was added and the prepolymer to water ratio was 3:4. To the suspension was also added 0.20 weight percent t-butyl perbenzoate as initiator and polymerization was completed and the polymer beads were washed with water. The beads were dried in a forced air drier at 180° C. and then extruded and injection molded. Impact—Izod 2.4 ft. lb/inch notch.

The foregoing examples illustrate the process of this invention and various embodiments thereof. There is thus illustrated the use of high prepolymer to water ratios which is a unique advantage of this process. This aspect enables high capacity and efficiency in commercial production. It also means less costly equipment for handling large amounts of water as would be required where, for example, prepolymer to water ratios of 1:5 were employed.

The minimum amount of water occulded in the polymer beads is a further unique advantage of this process. For example, in laboratory work it was found that the polymer could be easily dried at low temperature under vacuum or circulating air ovens, since all the water is surface adhered. If water were occluded in the polymer, expensive drying equipment would be needed to completely dry the beads. The beads prepared by the process of this invention contained only surface water, as evidenced by complete drying in simple low temperature oven.

A still further advantage of the process of this invention is the ability to use various temperatures during suspension polymerization, for example, temperature higher than 115° C. This versatility permits better control of time-temperature cycles and properties of the polymer.

In bulk-suspension polymerization reactions in accordance with this process, it was found that uniform beads of 20 to 25 mesh can be produced. All formulations above gave high impact polystyrene copolymers ranging from about 1.6 to 2.4 (and higher) ft. lbs/inch notch (as measured on compression molded bars). For masterbatch preparation, higher impact material can be obtained depending on the amount of rubbery material used in the formulations.

Modifications falling within the scope of this invention can be made without departing from the scope of the appended claims.

What is claimed is:

1. In a process for preparing a rubber-modified vinyl aromatic polymer which comprises dissolving, in the absence of aqueous diluents, from 2 to 25 weight percent of a rubbery polymer of a conjugated diolefin in a vinyl aromatic monomer selected from the groups consisting of styrene, lower alkyl nuclear substituted styrene, halogen nuclear substituted styrene and mixtures thereof, and partially polymerizing the resulting monomer-rubber solution to an extent of from 10 to 45 percent conversion, the improvement which comprises transferring the partially polymerized monomer-rubber mixture to an agitated aqueous suspension containing therein hydroxyethyl cellulose as the suspending agent, the partially polymerized monomer-rubber mixture being added in an amount such that its weight ratio to water in the aqueous suspension is about 1:2 to 5:4, said hydroxyethyl cellulose having a viscosity in a 1% aqueous solution at 25° C. of from 750 to 10,000 cps. (Brookfield viscometer) and a peroxide initiator, continuing agitation of the resulting suspension, polymerizing to substantial completion and recovering from said polymerization said rubber-modified vinyl aromatic polymer in bead form.

2. The process of claim 1 wherein the vinyl aromatic monomer is styrene.

3. The process of claim 1 wherein the rubbery polymer is linear polybutadiene.

4. The process of claim 1 wherein the rubbery polymer is a copolymer of styrene-butadiene.

5. In a process for preparing a rubber-modified styrene polymer which comprises dissolving, in the absence of aqueous diluents, from 4 to 20 weight percent of a rubbery polymer of a conjugated diolefin in styrene monomer and thereafter partially polymerizing the resulting styrene-rubber solution to an extent of from 10 to 45 percent conversion, the improvement which comprises transferring the partially polymerized styrene-rubber mixture to an agitated aqueous suspension containing therein hydroxyethyl cellulose as a suspending agent, the partially polymerized styrene-rubber mixture being added in an amount such that its weight ratio to water in the aqueous suspension is about 1:2 to 5:4, said hydroxyethyl cellulose being employed in an amount based on water of from 0.25 to 1.5 weight percent, said hydroxyethyl cellulose having a viscosity in a 1% aqueous solution at 25° C. of from 750 to 3500 cps. (Brookfield viscometer), and a peroxide initiator, continuing agitation of the resulting suspension, polymerizing to substantial completion and recovering from said polymerization said rubber-modified styrene polymer in bead form.

6. The process of claim 5 wherein the rubbery polymer is linear polybutadiene.

7. The process of claim 5 wherein the rubbery polymer is a copolymer of styrene-butadiene.

8. The process of claim 5 wherein the hydroxyethyl cellulose employed as a suspending agent has a viscosity in a 1% aqueous solution at 25° C. of from 1500 to 3500 cps. (Brookfield viscometer).

9. The process of claim 5 wherein the peroxide initiator comprises t-butyl perbenzoate.

10. A process for preparing rubber-modified styrene polymer which comprises dissolving, in the absence of aqueous diluents, from 4 to 20 weight percent of a rubbery polymer of a conjugated diolefin in styrene monomer and partially polymerizing the resulting styrene-rubber solution to an extent of from 15 to 35 percent conversion, the improvement which comprises transferring the partially polymerized styrene-rubber mixture to an agitated aqueous suspension containing therein hydroxyethyl cellulose as a suspending agent, the partially polymerized styrene-rubber mixture being added in an amount such that its weight ratio to water in the aqueous suspension is about 1:2 to 5:4, said hydroxyethyl cellulose being employed in an amount based on water of from 0.075 to 0.25 weight percent, said hydroxyethyl cellulose having a viscosity in a 1% aqueous solution of from 1500 to 3500 cps. at 25° C. (Brookfield viscometer), said suspension containing a peroxide initiator selected from the group consisting of t-butyl perbenzoate and ditertiary-butyl peroxide, and combinations of these, the amounts of said initiator based on the weight of the polymer being from .05 to 0.3 for t-butyl perbenzoate and ditertiary butyl peroxide when used alone, and from .052 to .25 where combinations of the initiators are employed, continuing agitation of the resulting suspension, polymerizing to substantial completion and recovering a rubber-modified polystyrene in bead form.

11. The process of claim 10 wherein the rubbery polymer is a linear polybutadiene having a cis-1,4-content of from 30 to 98 percent.

12. The process of claim 10 wherein the suspension is polymerized in the presence of t-butyl perbenzoate and combinations of t-butyl perbenzoate with other higher temperature peroxides under the following time-temperature cycles: 3 hours at 100° to 115° C. and 2 hours at 125° to 145° C.

13. A process for preparing rubber-modified styrene polymer which comprises dissolving, in the absence of aqueous diluents, from 2 to 25 weight percent of a rubbery polymer of a conjugated diolefin in styrene monomer and partially polymerizing the resulting styrene-rubber solution to an extent of from 10 to 45 percent conversion, the improvement which comprises transferring the partially polymerized styrene-rubber mixture to an agitated aqueous suspension containing therein hydroxyethyl cellulose as a suspending agent, the partially polymerized styrene-rubber mixture being added in an amount such that its weight ratio to water in the aqueous suspension is about 1:2 to 5:4, said hydroxyethyl cellulose being employed in an amount based on water of from .025 to 1.5 weight percent, said hydroxyethyl cellulose having a viscosity in a 1% aqueous solution at 25° C. of from 1500 to 2500 cps. (Brookfield viscometer), and a peroxide initiator, continuing agitation of the resulting suspension, polymerizing to substantial completion and recovering from said polymerization said rubber-modified styrene polymer in bead form.

References Cited by the Examiner
UNITED STATES PATENTS

| | | | |
|---|---|---|---|
| 2,889,308 | 6/1959 | Fedderson | 260—17 |
| 2,913,426 | 11/1959 | Li et al. | 260—880 |
| 3,047,534 | 7/1962 | Dyer et al. | 260—880 |

FOREIGN PATENTS

| | | |
|---|---|---|
| 873,948 | 8/1961 | Great Britain. |
| 1,128,142 | 4/1962 | Germany. |

MURRAY TILLMAN, *Primary Examiner.*

G. F. LESMES, *Assistant Examiner.*